United States Patent
Lu et al.

(10) Patent No.: US 12,547,414 B2
(45) Date of Patent: Feb. 10, 2026

(54) METHOD AND SYSTEM FOR SETTING OPTIONS OF BIOS, DEVICE AND STORAGE MEDIUM

(71) Applicant: SUZHOU METABRAIN INTELLIGENT TECHNOLOGY CO., LTD., Jiangsu (CN)

(72) Inventors: Fei Lu, Jiangsu (CN); Shanbin Ai, Jiangsu (CN); Youbo Wang, Jiangsu (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 47 days.

(21) Appl. No.: 18/696,724

(22) PCT Filed: Dec. 12, 2022

(86) PCT No.: PCT/CN2022/138452
§ 371 (c)(1),
(2) Date: Mar. 28, 2024

(87) PCT Pub. No.: WO2023/151373
PCT Pub. Date: Aug. 17, 2023

(65) Prior Publication Data
US 2024/0403061 A1    Dec. 5, 2024

(30) Foreign Application Priority Data
Feb. 11, 2022 (CN) .......................... 202210135046.9

(51) Int. Cl.
*G06F 9/4401* (2018.01)
(52) U.S. Cl.
CPC .................................. *G06F 9/4401* (2013.01)
(58) Field of Classification Search
None
See application file for complete search history.

(56) References Cited

U.S. PATENT DOCUMENTS

| | | | |
|---|---|---|---|
| 9,122,501 B1 | 9/2015 | Hsu et al. | |
| 2015/0154091 A1* | 6/2015 | Chen | G06F 11/1417 713/2 |

(Continued)

FOREIGN PATENT DOCUMENTS

| | | |
|---|---|---|
| CN | 103593250 A | 2/2014 |
| CN | 108052353 A | 5/2018 |

(Continued)

OTHER PUBLICATIONS

Chinese Search Report for Chinese Patent Application No. 2022101350469 dated Jul. 11, 2023.

(Continued)

*Primary Examiner* — Paul Yen
(74) *Attorney, Agent, or Firm* — Merchant & Gould P.C.

(57) ABSTRACT

Disclosed are a method and system for setting options of a basic input output system (BIOS), a device and a storage medium. The method includes: numbering different option combination modes; creating a first combination structure of the options configured to store numbers of the different option combination modes; sending a default option combination mode value from the BIOS to a baseboard management controller, and forming a second combination structure in the baseboard management controller; and reading configure values from the second combination structure, and executing different operations for option setting according to different configure values. According to the method, the options occupy a small storage space of the baseboard management controller, such that cost of a memory is saved. Logical processing is carried out by means of flag bits, such that the options are synchronized and set between the different combination modes.

18 Claims, 3 Drawing Sheets

(56) References Cited

U.S. PATENT DOCUMENTS

| | | | |
|---|---|---|---|
| 2015/0169330 A1 | 6/2015 | Maity et al. | |
| 2021/0004242 A1* | 1/2021 | Su | G06F 9/4416 |
| 2021/0286692 A1* | 9/2021 | Chien | G06F 11/2284 |

FOREIGN PATENT DOCUMENTS

| | | | |
|---|---|---|---|
| CN | 108170454 | A | 6/2018 |
| CN | 110187922 | A | 8/2019 |
| CN | 112527397 | A | 3/2021 |
| CN | 112559059 | A | 3/2021 |
| CN | 113010214 | A | 6/2021 |
| CN | 113849236 | A | 12/2021 |
| CN | 114528029 | A | 5/2022 |
| WO | 2023151373 | A1 | 8/2023 |

OTHER PUBLICATIONS

International Search Report and Written Opinion for International Patent Application No. PCT/CN2022/138452 mailed Feb. 7, 2023.

\* cited by examiner

METHOD AND SYSTEM FOR SETTING OPTIONS OF BIOS, DEVICE AND STORAGE MEDIUM

CROSS-REFERENCE TO RELATED APPLICATION

The present application is a National Stage Application of PCT International Application No. PCT/CN2022/138452 filed Dec. 12, 2022, which claims the benefit of priority to Chinese Patent Application No. 202210135046.9, filed with the China National Intellectual Property Administration on Feb. 11, 2022 and entitled "Method and system for setting options of BIOS, device and storage medium", the disclosure of which is hereby incorporated by reference in its entirety. To the extent appropriate, a claim of priority is made to each of the above disclosed applications.

TECHNICAL FIELD

The disclosure belongs to the technical field of option setting for basic input output system, and particularly relates to a method and system for setting options of a basic input output system (BIOS), a device and a storage medium.

BACKGROUND

As server technologies are constantly promoted and developed, performances, functions and ease of use of servers are constantly enhanced. A growing number of BIOS Setup configuration options are provided in the servers, and different clients can configure different option combinations according to their own business requirements. In a setting process, the following problems may be encountered: 1. a situation that clients are generally required to check status values of combined options in a business mode, 2. batch modification of the combined options, 3. batch modification of multi-node combined options, 4. configuration switching of combined options in different application modes of nodes, and 5. a situation that options take effects at next re-startup after being set by the clients. It is commonly required to enter a BIOS Setup interface to set options. However, a business operation mode generally exists in an operating system (OS). Even if the clients can enter the Setup interface through re-startup, batch modification and switching bring tremendous amount of work and adaptation cost to research, development, testing, operation and maintenance, which troubles users and is not conducive to ease of use of a server system.

SUMMARY

In order to solve the above problems, the disclosure provides a method and system for setting options of a basic input output system (BIOS), a device and a storage medium. The BIOS carries out logical processing by means of some flag bits, such that the options are synchronized and set between different combination modes are implemented, and operation is simple.

In order to achieve the above objective, the disclosure employs a method as follows:

A method for setting options of a BIOS includes steps as follows:

numbering different option combination modes; creating a first combination structure of the options configured to store numbers of the different option combination modes;

sending a default option combination mode value from the BIOS to a baseboard management controller, and forming a second combination structure in the baseboard management controller; and reading configuration values from the second combination structure, and executing different operations for option setting according to different configuration values.

Further, the first combination structure includes a first header, an offset and a value corresponding to each option, and a default value corresponding to each option.

Further, the second combination structure further includes a second header. The second header includes a first byte and a second byte. The first byte is a byte of a value corresponding to a mode in the BIOS. The second byte is a byte when a user sets the options.

Further, the configuration value represents an invalid mode, a first valid mode and a second valid mode.

The invalid mode refers to the mode where the configuration value of the second combination structure in the baseboard management controller is 0.

The first valid mode refers to the mode where the configuration value of the second combination structure in the baseboard management controller is 1.

The second valid mode refers to the mode where the configuration value of the second combination structure in the baseboard management controller is 2.

Further, the BIOS clears the configuration value in the second combination structure under the condition that the configuration value read from the second combination structure is the invalid mode. A configuration value of the first combination structure is sent to the baseboard management controller by means of an intelligent platform management interface (IPMI). The configuration value of the first combination structure is set as 1.

Further, the BIOS calculates a first cyclic redundancy check code in the first combination structure under the condition that the configuration value read from the second combination structure is the first valid mode. Moreover, the baseboard management controller is triggered to calculate a second cyclic redundancy check code of an option in the second combination structure. Startup is continued under the condition that the first cyclic redundancy check code is the same as the second cyclic redundancy check code.

The BIOS acquires the option in the second combination structure under the condition that the first cyclic redundancy check code is different from the second cyclic redundancy check code. The option is written into a BIOS storage module. The option in the second combination structure written into the BIOS storage module is set as 0. Re-startup is carried out after setting is completed.

Further, the BIOS restores the option of the first combination structure to a default value under the condition that the configuration value read from the second combination structure is the second valid mode. The option is set as 0. Re-startup is carried out after setting is completed.

The disclosure further provides a system for setting options of a BIOS. The system includes a creating module, a sending module and a setting module.

The creating module is configured to number different option combination modes and create a first combination structure of the options for storing numbers of the different option combination modes.

The sending module is configured to send a default option combination mode value to a baseboard management controller and form a second combination structure in the baseboard management controller.

The setting module is configured to read configuration values from the second combination structure and execute different operations for option setting according to different configuration values.

The disclosure further provides a device. The device includes:
- a memory, the memory is configured to store a computer program; and
- a processor, the processor is configured to performs steps of the above methods when executing the computer program.

The disclosure further provides a Non-Volatile readable storage medium. The Non-Volatile readable storage medium is configured to store a computer program. When the computer program is executed by a processor, the processor performs steps of the above methods.

Effects provided in the summary are only effects of some embodiments of the disclosure, rather than all effects of the disclosure. One of the above methods has advantages or beneficial effects as follows:

The disclosure provides a method and system for setting options of a BIOS, a device and a storage medium. The method includes: numbering different option combination modes; creating a first combination structure of the options configured to store numbers of the different option combination modes; sending a default option combination mode value from the BIOS to a baseboard management controller, and forming a second combination structure in the baseboard management controller; and reading configuration values from the second combination structure, and executing different operations for option setting according to different configuration values. On the basis of the method for setting options of a BIOS, a system for setting options of a BIOS, a device and a storage medium are provided. According to the disclosure, the options occupy a small storage space of the baseboard management controller, such that cost of a memory is saved. The BIOS carries out logical processing by means of some flag bits, such that the options are synchronized and set between the different combination modes are implemented. Moreover, when out-of-band modification is performed on the options, it is only required to set an offset and a value corresponding to an option in the baseboard management controller on a command. Non-research-and-development personnel only need to have a corresponding offset corresponding table to modify the options, such that simpleness is achieved and operation is easy. Finally, load default operation on the options is simple, and only one-bit modification is required.

The disclosure is generally used on an application based on a baseboard management controller and an IPMI, and occupies a small storage space of the baseboard management controller. The logic for sending and synchronization of an option in the BIOS is simple. Operation for setting options of BIOS by non-research-and-development personnel is simple. Operation for loading default of the options is simple. Switching between the different option combination modes is simple.

DETAILED DESCRIPTION OF THE EMBODIMENTS

In order to clearly describe the technical features of the disclosure, the disclosure will be described below in detail with some embodiments and the drawings. The following disclosure provides plenty of different examples or instances for implementing different structures of the disclosure. In order to simplify the disclosure, components and arrangements in particular instances will be described below. In addition, the disclosure can repeat reference numbers and/or letters in different instances. Such repetition is for simplicity and clarity, and does not indicate relations between various examples and/or arrangements discussed. It should be noted that components illustrated in the drawings are not certainly drawn to scale. Descriptions of well-known assemblies and processing technologies and processes are omitted in the disclosure, such that unnecessary limitation on the disclosure is avoided.

The disclosure integrates codes through BIOS and BMC to cover application scenarios of the clients, and uses the out-of-band management tool BMC and intelligent platform management interface (IPMI) commands to set options. Thus, research, development and maintenance cost is reduced and competitiveness of products is improved. BMC is a baseboard management controller, and BIOS is a basic input output system.

Figure 1:
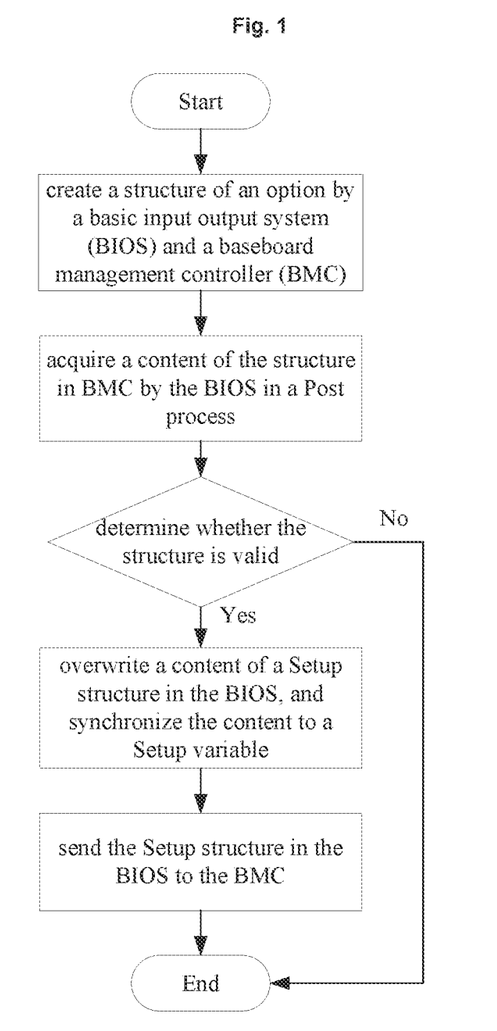
FIG. 1 is a flowchart of setting basic input output system (BIOS) options in the prior art.

As shown in FIG. 1, a flowchart of setting BIOS options in the prior art is shown. Firstly, a structure is established in each of the BIOS and the BMC, the structures store options and corresponding values, and the BIOS will send options and corresponding values to the BMC. Secondly, users can modify options in the BMC. Then, in a Post process, the BIOS acquires options from the BMC by means of an IPMI to synchronize options to the BIOS. Although the prior art implements out-of-band setting of the options by applying the BIOS/BMC/IPMI, code design logic is complicated and limited service scenarios are supported. In code logic, the prior art required to establish an option structure in a BMC static random-access memory (SRAM). Each option has index/current flag/current value/default flag/default value. Each index consists of group index and sub index, which will occupy a large space of the SRAM. Moreover, users are required to know a matching relation of each option index during setting, and it is difficult to easily set options unless the users are research and development personnel. In addition, at every startup, the BIOS is required to determine whether options should be synchronized. When the clients are prepared to load default for all the options, the clients are required to modify every options, this situation brings huge operation cost. Finally, when the clients have multiple modes of option combinations, switching between the modes is not supported. As a result, ease of use of products is poor, operation, research and development cost is high, and competitiveness of the products is poor.

Some embodiments of the disclosure provide a method for setting options of a basic input output system (BIOS), which sets the BIOS options on the basis of a baseboard management controller (BMC) and intelligent platform management interface (IPMI) manner. The method includes: number different option combination modes; create a first combination structure of the options configured to store numbers of the different option combination modes; send a default option combination mode value from the BIOS to a baseboard management controller, and form a second combination structure in the baseboard management controller; and read configuration values from the second combination structure, and execute different operations for option setting according to different configuration values.

The configuration value represents an invalid mode, a first valid mode and a second valid mode.

The invalid mode refers to the mode where the configuration value of the second combination structure in the baseboard management controller is 0.

The first valid mode refers to the mode where the configuration value of the second combination structure in the baseboard management controller is 1.

The second valid mode refers to the mode where the configuration value of the second combination structure in the baseboard management controller is 2.

The BIOS clears the configuration value in the second combination structure under the condition that the configuration value read from the second combination structure is the invalid mode. A configuration value of the first combination structure is sent to the baseboard management controller by means of an IPMI. The configuration value of the first combination structure is set as 1.

The BIOS calculates a first cyclic redundancy check code in the first combination structure under the condition that the configuration value read from the second combination structure is the first valid mode. Moreover, the baseboard management controller is triggered to calculate a second cyclic redundancy check code of an option in the second combination structure. Startup is continued under the condition that the first cyclic redundancy check code is the same as the second cyclic redundancy check code.

The BIOS acquires the option in the second combination structure under the condition that the first cyclic redundancy check code is different from the second cyclic redundancy check code. The option is written into a BIOS storage module. The option in the second combination structure written into the BIOS storage module is set as 0. Re-startup is carried out after setting is completed.

The BIOS restores the option of the first combination structure to a default value under the condition that the configuration value read from the second combination structure is the second valid mode. The option is set as 0. Re-startup is carried out after setting is completed.

In the disclosure, firstly, the modes of different option combinations are numbered by the BIOS. Secondly, a specific option combination structure is created in the BIOS, the combination structure has a header and stores numbers of the modes. Each option corresponds to an offset and a value. Moreover, the BIOS stores a default value corresponding to each option. The baseboard management controller is not required to consider how an option in the BIOS option structure is composed, and only required to receive offsets and values sent from the BIOS and sequentially sort the offsets and values to form a temporary structure. The baseboard management controller stores bytes of special values in a header of the temporary structure. One is a byte of a value corresponding to a mode in the BIOS and is referred to as A. The other one is a byte when a user sets the options and is referred to as B. The BIOS and baseboard management controller only need to perform logical processing according to such bytes to achieve option settings, synchronization, and switching.

Figure 2:
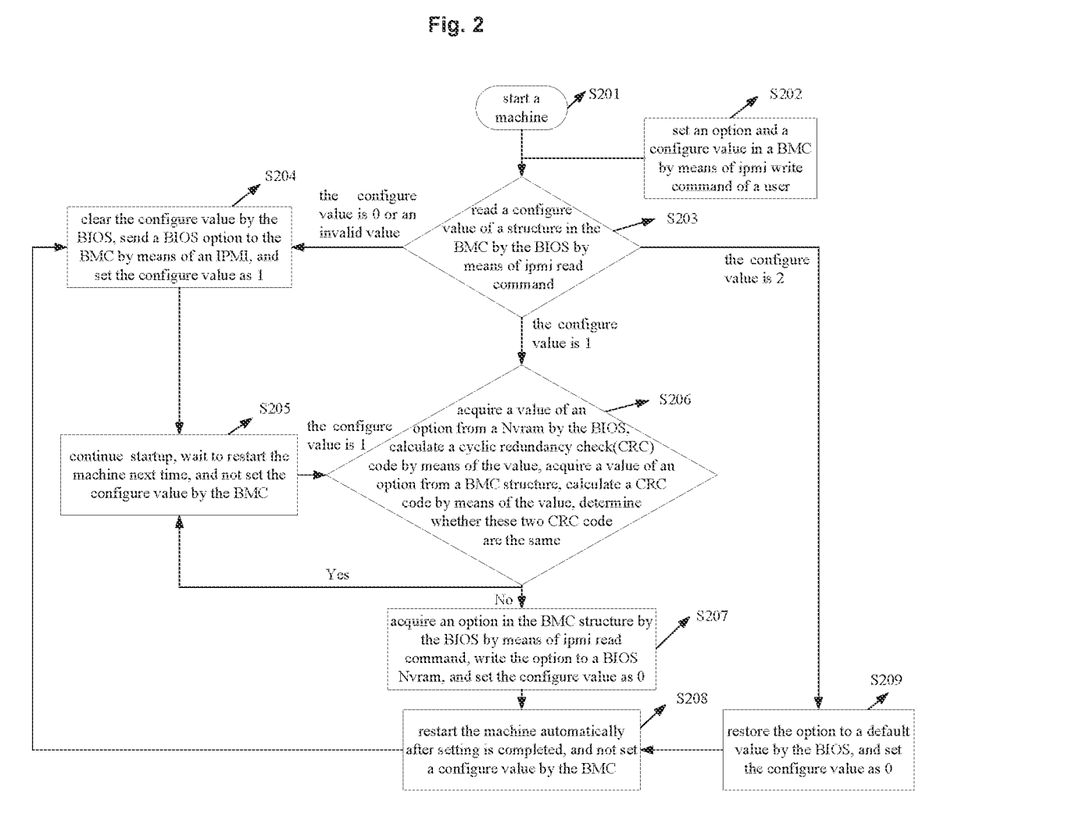
FIG. 2 is a flowchart of a method for setting options of a BIOS according to some embodiments of the disclosure.

FIG. 2 is a flowchart of a method for setting options of a BIOS according to some embodiments of the disclosure. The flow is a flow in mode A.

At step S201, a machine is started.

The BMC is empty. A default option combination mode value is sent to the baseboard management controller by the BIOS. The structure of the baseboard management controller only generates a header, the header storing synchronized mode value A and value B which is 0 by default. When a user wants to switch a specific mode, A is modified. The BIOS carries out switching according to value A at next startup. Operation steps of specific options are fixed in mode A.

At step S202, an option and a configuration value in the baseboard management controller is set by means of ipmi write command of a user.

At step S203, the configuration value is read from the second combination structure of the baseboard management controller by the BIOS by means of ipmi read command. Determine a mode represented by the configuration value. The configuration value represents an invalid mode, a first valid mode and a second valid mode. The invalid mode refers to the mode where the configuration value of the second combination structure in the baseboard management controller is 0. The first valid mode refers to the mode where the configuration value of the second combination structure in the baseboard management controller is 1. The second valid mode refers to the mode where the configuration value of the second combination structure in the baseboard management controller is 2. Execute S204 in a case that the configuration value is 0 or invalid. Execute S206 in a case that the configuration value is 1. Execute S209 in a case that the configuration value is 2.

At step S204, the configuration value in the second combination structure is cleared by the BIOS. A configuration value of the first combination structure is sent to the baseboard management controller by means of an IPMI. The configuration value of the first combination structure is set as 1.

At step S205, continue startup, wait to restart the machine next time, and not set the configuration value by the baseboard management controller.

At step S206, a first cyclic redundancy check code in the first combination structure is calculated by the BIOS. The baseboard management controller is triggered to calculate a second cyclic redundancy check code of an option in the second combination structure. Determine whether the first cyclic redundancy check code is the same as the second cyclic redundancy check code by the BIOS. Execute S205 under the condition that the first cyclic redundancy check code is the same as the second cyclic redundancy check code. Execute S207 under the condition that the first cyclic redundancy check code is different from the second cyclic redundancy check code.

At step S207, write the option in the second combination structure in the baseboard management controller to a BIOS non-volatile random-access memory (Nvram) by the BIOS by means of ipmi read command, and set flag bit B of the configuration value as 0x0.

At step S208, restart the machine automatically after setting is completed, and not set the configuration value by the baseboard management controller.

At step S209, the option of the first combination structure is restored to a default value by the BIOS. The BIOS set flag bit B of the configuration value as 0x0, and carry out re-startup after setting is completed.

Innovation points of some embodiments of the disclosure are as follows: firstly, the modes of different option combinations are numbered by the BIOS. Secondly, a specific option combination structure is created in the BIOS, the combination structure has a header and stores numbers of the modes. Each option corresponds to an offset and a value. Moreover, the BIOS stores a default value corresponding to each option. The baseboard management controller is not required to consider how an option in the BIOS option structure is composed, and only required to receive offsets and values sent from the BIOS and sequentially sort the offsets and values to form a temporary structure. The baseboard management controller stores bit of special values in a header of the temporary structure. One is bit of a value corresponding to a mode in the BIOS and is referred to as A. The other one is bit when a user sets the options and is referred to as B. The BIOS and baseboard management controller only need to perform logical processing according to such bit to achieve option settings, synchronization, and switching.

According to the method for setting options of a BIOS provided in some embodiments of the disclosure, the options occupy a small storage space of the BMC, such that cost of a memory is saved. The BIOS carries out logical processing by means of some flag bits, such that the options are synchronized and set between the different combination modes are implemented. Moreover, when out-of-band modification is performed on the options, it is only required to set offset and value corresponding to an option in the BMC on a command. Non-research-and-development personnel only need to have a corresponding offset corresponding table to modify the options, such that simpleness is achieved and operation is easy. Finally, load default operation on the options is simple, and only one-bit modification is required.

Figure 3:
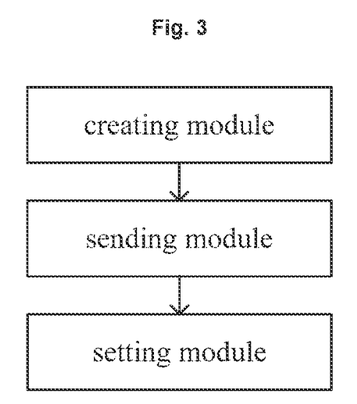
FIG. 3 is a schematic diagram of a system for setting options of a BIOS according to some embodiments of the disclosure.

On the basis of the method for setting options of a BIOS provided in some embodiments of the disclosure, some embodiments of the disclosure further provide a system for setting options of a BIOS. FIG. 3 is a schematic diagram of a system for setting options of a BIOS according to some embodiments of the disclosure. The system includes a creating module, a sending module and a setting module.

The creating module is configured to number different option combination modes and create a first combination structure of the options for storing numbers of the different option combination modes.

The sending module is configured to send a default option combination mode value to a baseboard management controller and form a second combination structure in the baseboard management controller.

The setting module is configured to read configuration values from the second combination structure and execute different operations for option setting according to different configuration values.

In the creating module, the first combination structure includes a first header, an offset and a value corresponding to each option, and a default value corresponding to each.

In the sending module, the second combination structure further includes a second header. The second header includes a first byte and a second byte.

The first byte is a byte of a value corresponding to a mode in the BIOS. The second byte is a byte when a user sets the options. The configuration value represents an invalid mode, a first valid mode and a second valid mode. The invalid mode refers to the mode where the configuration value of the second combination structure in the baseboard management controller is 0. The first valid mode refers to the mode where the configuration value of the second combination structure in the baseboard management controller is 1. The second valid mode refers to the mode where the configuration value of the second combination structure in the baseboard management controller is 2.

In the setting module, the BIOS clears the configuration value in the second combination structure under the condition that the configuration value read from the second combination structure is the invalid mode. A configuration value of the first combination structure is sent to the baseboard management controller by means of an IPMI. The configuration value of the first combination structure is set as 1.

The BIOS calculates a first cyclic redundancy check code in the first combination structure under the condition that the configuration value read from the second combination structure is the first valid mode. Moreover, the baseboard management controller is triggered to calculate a second cyclic redundancy check code of an option in the second combination structure. Startup is continued under the condition that the first cyclic redundancy check code is the same as the second cyclic redundancy check code.

The BIOS acquires the option in the second combination structure under the condition that the first cyclic redundancy check code is different from the second cyclic redundancy check code. The option is written into a BIOS storage module. The option in the second combination structure written into the BIOS storage module is set as 0. Re-startup is carried out after setting is completed.

The BIOS restores the option of the first combination structure to a default value under the condition that the configuration value read from the second combination structure is the second valid mode. The option is set as 0. Re-startup is carried out after setting is completed.

According to the system for setting options of a BIOS provided in some embodiments of the disclosure, the options occupy a small storage space of the BMC, such that cost of a memory is saved. The BIOS carries out logical processing by means of some flag bits, such that the options are synchronized and set between the different combination modes are implemented. Moreover, when out-of-band modification is performed on the options, it is only required to set offset and value corresponding to an option in the BMC on a command. Non-research-and-development personnel only need to have a corresponding offset corresponding table to modify the options, such that simpleness is achieved and operation is easy. Finally, load default operation on the options is simple, and only one-bit modification is required.

Some embodiments of the disclosure further provides a device. The device includes:
- a memory, the memory is configured to store a computer program; and
- a processor, the processor is configured to performs the following method steps when executing the computer program:

Firstly, the modes of different option combinations are numbered by the BIOS. Secondly, a specific option combination structure is created in the BIOS. The combination structure has a header and stores numbers of the modes. Each option corresponds to an offset and a value. Moreover, the BIOS stores a default value corresponding to each option. The baseboard management controller is not required to consider how an option in the BIOS option structure is composed, and only required to receive offsets and values sent from the BIOS and sequentially sort the offsets and values to form a temporary structure. The baseboard management controller stores bytes of special values in a header of the temporary structure. One is a byte of a value corresponding to a mode in the BIOS and is referred to as A. The other one is a byte when a user sets the options and is referred to as B. The BIOS and baseboard management controller only need to perform logical processing according to such bytes to achieve option settings, synchronization, and switching.

FIG. 2 is a flowchart of a method for setting options of a BIOS according to some embodiments of the disclosure. The flow is a flow in mode A.

At step S201, a machine is started.

The BMC is empty. A default option combination mode value is sent to the baseboard management controller by the BIOS. The structure of the baseboard management controller only generates a header, the header storing synchronized mode value A and value B which is 0 by default. When a user wants to switch a specific mode, A is modified. The BIOS carries out switching according to value A at next startup. Operation steps of specific options are fixed in mode A.

At step S202, an option and a configuration value in the baseboard management controller is set by means of ipmi write command of a user.

At step S203, the configuration value is read from the second combination structure of the baseboard management controller by the BIOS by means of ipmi read command. Determine a mode represented by the configuration value. The configuration value represents an invalid mode, a first valid mode and a second valid mode. The invalid mode refers to the mode where the configuration value of the second combination structure in the baseboard management controller is 0. The first valid mode refers to the mode where the configuration value of the second combination structure in the baseboard management controller is 1. The second valid mode refers to the mode where the configuration value of the second combination structure in the baseboard management controller is 2. Execute S204 in a case that the configuration value is 0 or invalid. Execute S206 in a case that the configuration value is 1. Execute S209 in a case that the configuration value is 2.

At step S204, the configuration value in the second combination structure is cleared by the BIOS. A configuration value of the first combination structure is sent to the baseboard management controller by means of an IPMI. The configuration value of the first combination structure is set as 1.

At step S205, continue startup, wait to restart the machine next time, and not set the configuration value by the baseboard management controller.

At step S206, a first cyclic redundancy check code in the first combination structure is calculated by the BIOS. The baseboard management controller is triggered to calculate a second cyclic redundancy check code of an option in the second combination structure. Determine whether the first cyclic redundancy check code is the same as the second cyclic redundancy check code by the BIOS. Execute S205 under the condition that the first cyclic redundancy check code is the same as the second cyclic redundancy check code. Execute S207 under the condition that the first cyclic redundancy check code is different from the second cyclic redundancy check code.

At step S207, write the option in the second combination structure in the baseboard management controller to a BIOS Nvram by the BIOS by means of ipmi read command, and set flag bit B of the configuration value as 0x0.

At step S208, restart the machine automatically after setting is completed, and not set the configuration value by the baseboard management controller.

At step S209, the option of the first combination structure is restored to a default value by the BIOS. The BIOS set flag bit B of the configuration value as 0x0, and carry out re-startup after setting is completed.

Innovation points of some embodiments of the disclosure are as follows: firstly, the modes of different option combinations are numbered by the BIOS. Secondly, a specific option combination structure is created in the BIOS, the combination structure has a header and stores numbers of the modes. Each option corresponds to an offset and a value. Moreover, the BIOS stores a default value corresponding to each option. The baseboard management controller is not required to consider how an option in the BIOS option structure is composed, and only required to receive offsets and values sent from the BIOS and sequentially sort the offsets and values to form a temporary structure. The baseboard management controller stores bit of special values in a header of the temporary structure. One is bit of a value corresponding to a mode in the BIOS and is referred to as A. The other one is bit when a user sets the options and is referred to as B. The BIOS and baseboard management controller only need to perform logical processing according to such bit to achieve option settings, synchronization, and switching.

According to the device for setting options of a BIOS provided in some embodiments of the disclosure, the options occupy a small storage space of the BMC, such that cost of a memory is saved. The BIOS carries out logical processing by means of some flag bits, such that the options are synchronized and set between the different combination modes are implemented. Moreover, when out-of-band modification is performed on the options, it is only required to set offset and value corresponding to an option in the BMC on a command. Non-research-and-development personnel only need to have a corresponding offset corresponding table to modify the options, such that simpleness is achieved and operation is easy. Finally, load default operation on the options is simple, and only one-bit modification is required.

It should be noted that the method of the disclosure further provides an electronic device. The electronic device includes a communication interface, which may exchange information with other devices such as a network device; and a processor, which is connected to the communication interface to exchange information with other devices and configured to execute a virtualization system monitoring method provided in at least one above methods when running a computer program. The computer program is stored in a memory. Certainly, various assembles in the electronic device are coupled together by means of a bus system during practical application. It can be understood that the bus system is configured for connection and communication between these assembles. The bus system includes a data bus, a power bus, a control bus and a status signal bus. The memory in some embodiments of the disclosure is configured to store various types of data to support operations of the electronic device. Instances of such data include any computer program configured to be operated on the electronic device. It can be understood that the memory may be a volatile memory or a non-volatile memory, and may also include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, an optical disc or a compact disc read-only memory (CD-ROM). The magnetic surface memory may be a magnetic disc memory or a magnetic tape memory. The volatile memory may be a random-access memory (RAM), which serves as an external cache. Through illustrative but not limitative description, plenty of forms of RAMs can be used, such a static random-access memory (SRAM), a synchronous static random-access memory (SSRAM), a dynamic random-access memory (DRAM), a synchronous dynamic random-access memory (SDRAM), a double data rate synchronous dynamic random-access memory (DDRS-DRAM), an enhanced synchronous dynamic random-access memory (ESDRAM), a synclink dynamic random-access memory (SLDRAM) and a direct rambus random-access memory (DRRAM). The memory described in some embodiments of the disclosure includes but is not limited to these and any other suitable types of memories. The methods disclosed in some embodiments of the disclosure can be applied to or implemented by a processor. The processor may be an integrated circuit chip having a signal processing capability. In an implementation process, steps of the above method can be completed by an integrated logic circuit of hardware or an instruction in a form of software in the processor. The above processor may be a general-purpose processor, a chip for digital signal processing (DSP) or other programmable logic devices, a discrete gate or transistor logic device, or a discrete hardware component, etc. The processor can implement or execute methods, steps and logic blocks disclosed in some embodiments of the disclosure. The general-purpose processor can be a microprocessor or any conventional processor, etc. Steps of the method disclosed in combination with some embodiments of the disclosure can be directly executed by a hardware decoding processor or a combination of hardware and software modules in the decoding processor. The software module can be located in a storage medium, and the storage medium is located in the memory. The processor reads a program in the memory and completes the steps of the aforementioned method in combination with hardware of the processor. The processor implements corresponding flows in the methods of some embodiments of the disclosure when executing the program, which will not be repeated herein for the sake of brevity.

Some embodiments of the disclosure further provides a Non-Volatile readable storage medium. The Non-Volatile readable storage medium is configured to store a computer program. When the computer program is executed by a processor, the processor performs method steps as follows:

Firstly, the modes of different option combinations are numbered by the BIOS. Secondly, a specific option combination structure is created in the BIOS. The combination structure has a header and stores numbers of the modes. Each option corresponds to an offset and a value. Moreover, the BIOS stores a default value corresponding to each option. The baseboard management controller is not required to consider how an option in the BIOS option structure is composed, and only required to receive offsets and values sent from the BIOS and sequentially sort the offsets and values to form a temporary structure. The baseboard management controller stores bytes of special values in a header of the temporary structure. One is a byte of a value corresponding to a mode in the BIOS and is referred to as A. The other one is a byte when a user sets the options and is referred to as B. The BIOS and baseboard management controller only need to perform logical processing according to such bytes to achieve option settings, synchronization, and switching.

FIG. 2 is a flowchart of a method for setting options of a BIOS according to some embodiments of the disclosure. The flow is a flow in mode A.

At step S201, a machine is started.

The BMC is empty. A default option combination mode value is sent to the baseboard management controller by the BIOS. The structure of the baseboard management controller only generates a header, the header storing synchronized mode value A and value B which is 0 by default. When a user wants to switch a specific mode, A is modified. The BIOS carries out switching according to value A at next startup. Operation steps of specific options are fixed in mode A.

At step S202, an option and a configuration value in the baseboard management controller is set by means of ipmi write command of a user.

At step S203, the configuration value is read from the second combination structure of the baseboard management controller by the BIOS by means of ipmi read command. Determine a mode represented by the configuration value. The configuration value represents an invalid mode, a first valid mode and a second valid mode. The invalid mode refers to the mode where the configuration value of the second combination structure in the baseboard management controller is 0. The first valid mode refers to the mode where the configuration value of the second combination structure in the baseboard management controller is 1. The second valid mode refers to the mode where the configuration value of the second combination structure in the baseboard management controller is 2. Execute S204 in a case that the configuration value is 0 or invalid. Execute S206 in a case that the configuration value is 1. Execute S209 in a case that the configuration value is 2.

At step S204, the configuration value in the second combination structure is cleared by the BIOS. A configuration value of the first combination structure is sent to the baseboard management controller by means of an IPMI. The configuration value of the first combination structure is set as 1.

At step S205, continue the startup, wait to restart the machine next time, and not set the configuration value by the baseboard management controller.

At step S206, a first cyclic redundancy check code in the first combination structure is calculated by the BIOS. The baseboard management controller is triggered to calculate a second cyclic redundancy check code of an option in the second combination structure. Determine whether the first cyclic redundancy check code is the same as the second cyclic redundancy check code by the BIOS. Execute S205 under the condition that the first cyclic redundancy check code is the same as the second cyclic redundancy check code. Execute S207 under the condition that the first cyclic redundancy check code is different from the second cyclic redundancy check code.

At step S207, write the option in the second combination structure in the baseboard management controller to a BIOS Nvram by the BIOS by means of ipmi read command, and set flag bit B of the configuration value as 0x0.

At step S208, restart the machine automatically after setting is completed, and not set the configuration value by the baseboard management controller.

At step S209, the option of the first combination structure is restored to a default value by the BIOS. The BIOS set flag bit B of the configuration value as 0x0, and carry out re-startup after setting is completed.

Innovation points of some embodiments of the disclosure are as follows: firstly, the modes of different option combinations are numbered by the BIOS. Secondly, a specific option combination structure is created in the BIOS, the combination structure has a header and stores numbers of the modes. Each option corresponds to an offset and a value. Moreover, the BIOS stores a default value corresponding to each option. The baseboard management controller is not required to consider how an option in the BIOS option structure is composed, and only required to receive offsets and values sent from the BIOS and sequentially sort the offsets and values to form a temporary structure. The baseboard management controller stores bit of special values in a header of the temporary structure. One is bit of a value corresponding to a mode in the BIOS and is referred to as A. The other one is bit when a user sets the options and is referred to as B. The BIOS and baseboard management controller only need to perform logical processing according to such bit to achieve option settings, synchronization, and switching.

According to the storage medium for setting options of a BIOS provided in some embodiments of the disclosure, the options occupy a small storage space of the BMC, such that cost of a memory is saved. The BIOS carries out logical processing by means of some flag bits, such that the options are synchronized and set between the different combination modes are implemented. Moreover, when out-of-band modification is performed on the options, it is only required to set offset and value corresponding to an option in the BMC on a command. Non-research-and-development personnel only need to have a corresponding offset corresponding table to modify the options, such that simpleness is achieved and operation is easy. Finally, load default operation on the options is simple, and only one-bit modification is required.

Some embodiments of the disclosure further provide a storage medium, that is, a computer storage medium, a non-volatile computer-readable storage medium. For instance, the storage medium includes a memory storing a computer program. The above computer program can be executed by a processor to complete steps of the aforementioned method. The non-volatile computer-readable storage medium may be a FRAM, an ROM, a PROM, an EPROM, an EEPROM, a Flash Memory, a magnetic surface memory, an optical disc, a CD-ROM or other memories.

Those of ordinary skill in the art can understand that all or some steps of the above method embodiments can be completed by related hardware instructed by the program. The aforementioned program can be stored in a computer-readable storage medium. The program executes the steps of the above method embodiments when executed. The aforementioned storage medium includes a mobile storage device, an ROM, an RAM, a magnetic disc or an optical disc and other media that can store program code. Alternatively, when the above integrated unit in the disclosure is implemented in a form of a software functional module and sold or used as an independent product, the integrated unit can also be stored in a computer-readable storage medium. On the basis of such understanding, methods of some embodiments of the disclosure in essence or the part contributing to the prior art can be embodied in a form of software products. The computer software products are stored in a storage medium and include several instructions for causing an electronic device (which may be a personal computer, a server or a network device, etc.) to execute all or part of the method in each embodiment of the disclosure. The aforementioned storage medium includes a mobile storage device, an ROM, an RAM, a magnetic disc or an optical disc and other media that can store program code.

For the description of the related parts in the processing device and storage medium for setting options of a BIOS provided in some embodiments of the disclosure, reference can be made to the detailed description of the corresponding parts in the method for setting options of a BIOS provided in some embodiments of the disclosure, which will not be repeated herein.

It should be noted that relational terms such as first and second herein are merely used to distinguish one entity or operation from another entity or operation without certainly requiring or implying any such actual relation or order between such entities or operations. In addition, the term "include", "comprise" or their any other variations is intended to cover a non-exclusive inclusion, such that inherent elements of a process, a method, an article or a device including a series of elements are included. Under the circumstance of no more limitations, an element limited by the phrase "comprising a . . . " or "including a . . . " does not exclude other same elements in a process, a method, an article or a device including the element. In addition, the parts of the above methods provided in some embodiments of the disclosure that have the same implementation principles with the corresponding methods in the prior art are not described in detail, so as to avoid repetition.

Particular embodiments of the disclosure are described above in combination with the drawings, but do not limit the scope of protection of the disclosure. Those skilled in the pertained field can make modifications or variations in other different forms on the basis of the above description. There are no need and no way to exhaust all embodiments. On the basis of the methods of the disclosure, various modifications or variations that can be made by those skilled in the art without creative labor still fall within the scope of protection of the disclosure.

What is claimed is:

1. A method for setting options of a basic input output system (BIOS), comprising:
    numbering different option combination modes; creating a first combination structure of the options configured to store number values of the different option combination modes;
    sending a default option combination mode number value from the BIOS to a baseboard management controller, and forming a second combination structure in the baseboard management controller; and
    reading configuration values from the second combination structure, and executing different operations for option setting according to different configuration values, wherein configuration values are set by a user through an intelligent platform management interface (IPMI) write command;
    wherein the sending a default option combination mode value from the BIOS to a baseboard management controller, and forming a second combination structure in the baseboard management controller comprise:
    sending a value corresponding to a default option from the BIOS to the baseboard management controller, and forming the second combination structure in the baseboard management controller
    wherein the reading configuration values from the second combination structure, and executing different operations for option setting according to different configuration values comprise:
    reading the configuration value from the second combination structure; and
    acquiring a mode corresponding to the configuration value, and executing the different operations for option setting in modes corresponding to the different configuration values;

wherein the mode corresponding to the configuration value comprises an invalid mode, a first valid mode, and a second valid mode;
the invalid mode is configured to indicate that the configuration value of the second combination structure in the baseboard management controller is 0;
the first valid mode is configured to indicate that the configuration value of the second combination structure in the baseboard management controller is 1; and
the second valid mode is configured to indicate that the configuration value of the second combination structure in the baseboard management controller is 2;
wherein the acquiring a mode corresponding to the configuration value, and executing the different operations for option setting in modes corresponding to the different configuration values comprise:
clearing the configuration value in the second combination structure by the BIOS under the condition that the mode corresponding to the configuration value read from the second combination structure is the invalid mode, sending a configuration value of the first combination structure to the baseboard management controller, and setting the configuration value of the first combination structure as 1.

2. The method for setting options of a BIOS as claimed in claim 1, wherein the first combination structure comprises a first header, a value corresponding to each option, and a default value corresponding to each option.

3. The method for setting options of a BIOS as claimed in claim 2, wherein the creating a first combination structure of the options configured to store numbers of the different option combination modes comprises:
creating the first combination structure of the options, wherein the first header in the first combination structure is configured to store the number value of the different option combination modes.

4. The method for setting options of a BIOS as claimed in claim 1, wherein the second combination structure is formed by the baseboard management controller sequentially sorting the received values sent from the BIOS.

5. The method for setting options of a BIOS as claimed in claim 1, wherein the second combination structure further comprises a second header, and the second header is configured to store a byte of a value which differs from a default value.

6. The method for setting options of a BIOS as claimed in claim 5, wherein the second header comprises a first byte and a second byte; the first byte is a byte of a value corresponding to a mode in the BIOS; and the second byte is a byte corresponding to options set by the user.

7. The method for setting options of a BIOS as claimed in claim 6, wherein the reading configuration values from the second combination structure, and executing different operations for option setting according to different configuration values comprise:
reading a byte of the configuration value from the second combination structure; and performing logical processing according to the byte of the configuration value to executing the different operations for option setting.

8. The method for setting options of a BIOS as claimed in claim 1, wherein the sending a configuration value of the first combination structure to the baseboard management controller comprises:
sending the configuration value of the first combination structure to the baseboard management controller by means of an intelligent platform management interface (IPMI) command.

9. The method for setting options of a BIOS as claimed in claim 1, wherein after the configuration value in the second combination structure is cleared, a configuration value of the first combination structure is sent to the baseboard management controller, and the configuration value of the first combination structure is set as 1, the method further comprises:
continuing startup, waiting for next re-startup, and not setting the configuration value of the second combination structure by the baseboard management controller.

10. The method for setting options of a BIOS as claimed in claim 1, wherein the acquiring a mode corresponding to the configuration value, and executing the different operations for option setting in modes corresponding to the different configuration values comprise:
calculating a first cyclic redundancy check code in the first combination structure by the BIOS under the condition that the mode corresponding to the configuration value read from the second combination structure is the first valid mode, and triggering the baseboard management controller to calculate a second cyclic redundancy check code of an option in the second combination structure;
determining whether the first cyclic redundancy check code is the same as the second cyclic redundancy check code; and
continuing startup once it is determined the first cyclic redundancy check code is the same as the second cyclic redundancy check code.

11. The method for setting options of a BIOS as claimed in claim 10, wherein after the result of whether the first cyclic redundancy check code is the same as the second cyclic redundancy check code is determined, the method further comprises:
acquiring the option in the second combination structure by the BIOS once it is determined the first cyclic redundancy check code is different from the second cyclic redundancy check code, writing the option into a BIOS storage module, setting the option in the second combination structure written into the BIOS storage module as 0, and carrying out re-startup after setting is completed.

12. The method for setting options of a BIOS as claimed in claim 11, wherein after the carrying out re-startup after setting is completed, the method further comprises:
carrying out automatic re-startup after the setting is completed, and not setting the configuration value of the second combination structure by the baseboard management controller.

13. The method for setting options of a BIOS as claimed in claim 1, wherein the acquiring a mode corresponding to the configuration value, and executing the different operations for option setting in modes corresponding to the different configuration values comprise:
restoring the option of the first combination structure to a default value by the BIOS under the condition that the mode corresponding to the configuration value read from the second combination structure is the second valid mode, setting the option as 0, and carrying out re-startup after setting is completed.

14. The method of claim 1, wherein configuration values are set by a user through an intelligent platform management interface (IPMI) write command; and
wherein the sending a default option combination mode value from the BIOS to a baseboard management controller, and forming a second combination structure in the baseboard management controller comprise:

sending a value corresponding to a default option from the BIOS to the baseboard management controller, and forming the second combination structure in the baseboard management controller.

15. A device, comprising:
a memory, the memory is configured to store a computer program; and
a processor, wherein when the computer program is executed by the processor, cause the processor to:
number different option combination modes; create a first combination structure of the options configured to store number values of the different option combination modes;
send a default option combination mode number value from the BIOS to a baseboard management controller, and form a second combination structure in the baseboard management controller; and
read configuration values from the second combination structure, and execute different operations for option setting according to different configuration values, wherein configuration values are set by a user through an intelligent platform management interface (IPMI) write command;
wherein the send a default option combination mode value from the BIOS to a baseboard management controller, and form a second combination structure in the baseboard management controller comprise:
send a value corresponding to a default option from the BIOS to the baseboard management controller, and form the second combination structure in the baseboard management controller
wherein the read configuration values from the second combination structure, and execute different operations for option setting according to different configuration values comprise:
read the configuration value from the second combination structure; and
acquire a mode corresponding to the configuration value, and execute the different operations for option setting in modes corresponding to the different configuration values;
wherein the mode corresponding to the configuration value comprises an invalid mode, a first valid mode, and a second valid mode;
the invalid mode is configured to indicate that the configuration value of the second combination structure in the baseboard management controller is 0;
the first valid mode is configured to indicate that the configuration value of the second combination structure in the baseboard management controller is 1; and
the second valid mode is configured to indicate that the configuration value of the second combination structure in the baseboard management controller is 2;
wherein the acquire a mode corresponding to the configuration value, and execute the different operations for option setting in modes corresponding to the different configuration values comprise:
clear the configuration value in the second combination structure by the BIOS under the condition that the mode corresponding to the configuration value read from the second combination structure is the invalid mode, send a configuration value of the first combination structure to the baseboard management controller, and set the configuration value of the first combination structure as 1.

16. The device of claim 15, wherein configuration values are set by a user through an intelligent platform management interface (IPMI) write command;
wherein the send a default option combination mode value from the BIOS to a baseboard management controller, and form a second combination structure in the baseboard management controller comprise:
send a value corresponding to a default option from the BIOS to the baseboard management controller, and form the second combination structure in the baseboard management controller.

17. A non-volatile computer-readable storage medium, the non-volatile computer-readable storage medium is configured to store a computer program, wherein when the computer program is executed by a processor, cause the processor to:
number different option combination modes; create a first combination structure of the options configured to store numbers of the different option combination modes;
send a default option combination mode value from the BIOS to a baseboard management controller, and form a second combination structure in the baseboard management controller; and
read configuration values from the second combination structure, and execute different operations for option setting according to different configuration values;
wherein the read configuration values from the second combination structure, and execute different operations for option setting according to different configuration values comprise:
read the configuration value from the second combination structure; and
acquire a mode corresponding to the configuration value, and execute the different operations for option setting in modes corresponding to the different configuration values;
wherein the mode corresponding to the configuration value comprises an invalid mode, a first valid mode, and a second valid mode;
the invalid mode is configured to indicate that the configuration value of the second combination structure in the baseboard management controller is 0;
the first valid mode is configured to indicate that the configuration value of the second combination structure in the baseboard management controller is 1; and
the second valid mode is configured to indicate that the configuration value of the second combination structure in the baseboard management controller is 2;
wherein the acquire a mode corresponding to the configuration value, and execute the different operations for option setting in modes corresponding to the different configuration values comprise:
clear the configuration value in the second combination structure by the BIOS under the condition that the mode corresponding to the configuration value read from the second combination structure is the invalid mode, send a configuration value of the first combination structure to the baseboard management controller, and set the configuration value of the first combination structure as 1.

18. The non-volatile computer-readable storage medium as claimed in claim 17, wherein the first combination structure comprises a first header, a value corresponding to each option, and a default value corresponding to each option.

* * * * *